United States Patent

Schoubye

[11] Patent Number: 6,159,440
[45] Date of Patent: Dec. 12, 2000

[54] PROCESS FOR PRODUCTION OF AMMONIUM THIOSULPHATE

[75] Inventor: Peter Schoubye, Hørsholm, Denmark

[73] Assignee: Haldor Topsoe A/S, Lyngby, Denmark

[21] Appl. No.: 09/227,058

[22] Filed: Jan. 7, 1999

[30] Foreign Application Priority Data

Jan. 9, 1998 [DK] Denmark .......................... 1998 00030

[51] Int. Cl.$^7$ .............................. C01B 17/62; C01B 17/64
[52] U.S. Cl. .......................................... 423/514; 423/519
[58] Field of Search ................................. 423/388, 514, 423/519, 544, 545, 547

[56] References Cited

U.S. PATENT DOCUMENTS

| | | | |
|---|---|---|---|
| 2,412,607 | 12/1946 | Farr et al. | 423/514 |
| 3,431,070 | 3/1969 | Keller | 423/514 |
| 3,473,891 | 10/1969 | Mack | 423/514 |
| 3,524,724 | 8/1970 | Every et al. | 423/514 |
| 4,478,807 | 10/1984 | Ott | 423/514 |

OTHER PUBLICATIONS

"Thiosulfates", Kirk–Othmer Encyclopedia of Chemical Technology, 4th edition, 1997, vol. 24, pp. 60–63.

*Primary Examiner*—Wayne Langel
*Assistant Examiner*—Maribel Medina
*Attorney, Agent, or Firm*—Ostrolenk, Faber, Gerb & Soffen, LLP

[57] ABSTRACT

A process for continuous production of ammonium thiosulphate from $H_2S$, $SO_2$, and $NH_3$ comprising steps of producing in a first absorption step a solution of ammonium hydrogen sulphite by contacting a first gas stream comprising $SO_2$ with $NH_3$ and an aqueous solution comprising ammonium hydrogen sulphite in one or more absorbers connected in series and withdrawing a vent gas from one of the absorbers, passing the solution produced in the first absorption step to a second absorption step in which a second gas stream comprising $H_2S$ is contacted with $NH_3$ and an aqueous solution of ammonium thiosulphate thereby producing a solution being rich in ammonium thiosulphate.

7 Claims, 3 Drawing Sheets

PROCESS FOR PRODUCTION OF AMMONIUM THIOSULPHATE

BACKGROUND OF THE INVENTION

The present invention relates to a process for the continuous production of ammonium thiosulphate.

It is known to produce aqueous solutions of ammonium thiosulphate (ATS) by reacting a solution of ammonium sulphites with sulphur in solid or liquid form, or with sulphides or polysulphides typically in aqueous solution, as described in Kirk-Othmer Encyclopedia of Chemical Technology, 4th edition, 1997, vol. 24, page 62, and in U.S. Pat. Nos. 2,412,607; 3,473,891; 3,524,724 and 4,478,807.

It is also known from U.S. Pat. No. 3,431,070 to produce ATS in a continuous process from gaseous feed streams comprising $H_2S$, $NH_3$ and $SO_2$. By the process of this patent, ATS and sulphur is produced from a first feed gas stream comprising $H_2S$ and $NH_3$ and a second feed gas stream comprising $SO_2$ in a process comprising three absorption steps. In a first absorber, $NH_3$ and $H_2S$ in the first feed gas stream are separated in a $H_2S$ off-gas stream and a $NH_3$-rich solution of ATS. The main part of the solution is passed to a second absorber, in which it is contacted with the $SO_2$-rich feed gas stream under formation of off-gas that is vented and a solution rich in ATS and ammonium sulphites, which in a third absorber is contacted with the $H_2S$ off-gas from the first absorber and, optionally, with additional $H_2S$. After removal of sulphur being formed in the third absorber, the major part of the ATS-solution formed in the third absorber is recycled to the first absorber, while the minor part is mixed with a fraction of the $NH_3$-rich solution of ATS formed in the first absorber forming the product solution of ATS.

The major disadvantage of this process is that off-gas from the third absorber contains high concentrations of $H_2S$ being emitted from the process.

SUMMARY OF THE INVENTION

The general object of this invention is to establish improved process for the production of ammonium thiosulphate without the disadvantage of the known process.

Accordingly, the invention provides a process for continuous production of ammonium thiosulphate from $H_2S$, $S_{O2}$ and $NH_3$ comprising steps of producing in a first absorption step a solution of ammonium hydrogen sulphite by contacting a first gas stream comprising $SO_2$ with $NH_3$ and an aqueous solution comprising ammonium hydrogen sulphite in one or more absorbers connected in series and withdrawing a vent gas from one of the absorbers, passing the solution produced in the first absorption step to a second absorption step in which a second gas stream comprising $H_2S$ is contacted with $NH_3$ and an aqueous solution of ammonium thiosulphate thereby producing a solution being rich in ammonium thiosulphate.

DESCRIPTION OF THE INVENTION

The invention is described more detailed in the following description, referring to specific embodiments of the invention for the production of concentrated ammonium thiosulphate (ATS) solutions from off-gases with $H_2S$, $NH_3$, $SO_2$, combustible S-compounds, hydrocarbons, $CO_2$ and $H_2O$. By a $SO_2$-absorption step in one or two absorbers connected in series $SO_2$-absorbed in ammonia resulting in a concentrated solution of ammonium hydrogen sulphite (AHS).

Subsequently, the AHS solution is reacted with $H_2S$ and $NH_3$ in a $H_2S$-absorber to a concentrated solution of ATS stabilized with minor amounts of ammonium sulphite. Combustibles compounds in the process gas streams being passed to the $SO_2$ absorber are oxidized to $SO_2$, $H_2O$ and $CO_2$ with equivalent amounts of oxygen air upstream of the $SO_2$-absorber. The off-gas from the $H_2S$-absorber may contain considerable amounts of $H_2S$ and is passed to an incinerator.

The above process has the following advantages compared to known processes for continuous production of a highly concentrated stream of ATS: Only two absorption steps have to be employed and it does not require and does not produce any solid or liquid with sulphur, sulphites or polysulphides. The process may employ a wide range of feed gas compositions. Up to 99.99% of the sulphur in the feed gases are recovered in the product solution of ATS with a concentration of up to 65% ATS and 0.1–1% sulphites. No $H_2S$ is emitted from the process. The sole emission from the process is 100–200 ppm $SO_2$ and a few ppm $NH_3$ in the off-gas from the $SO_2$-absorption step, when the $SO_2$ absorption step is performed in two absorption towers in series.

BRIEF DESCRIPTION OF THE DRAWINGS

In the appended drawings

Figure 1:
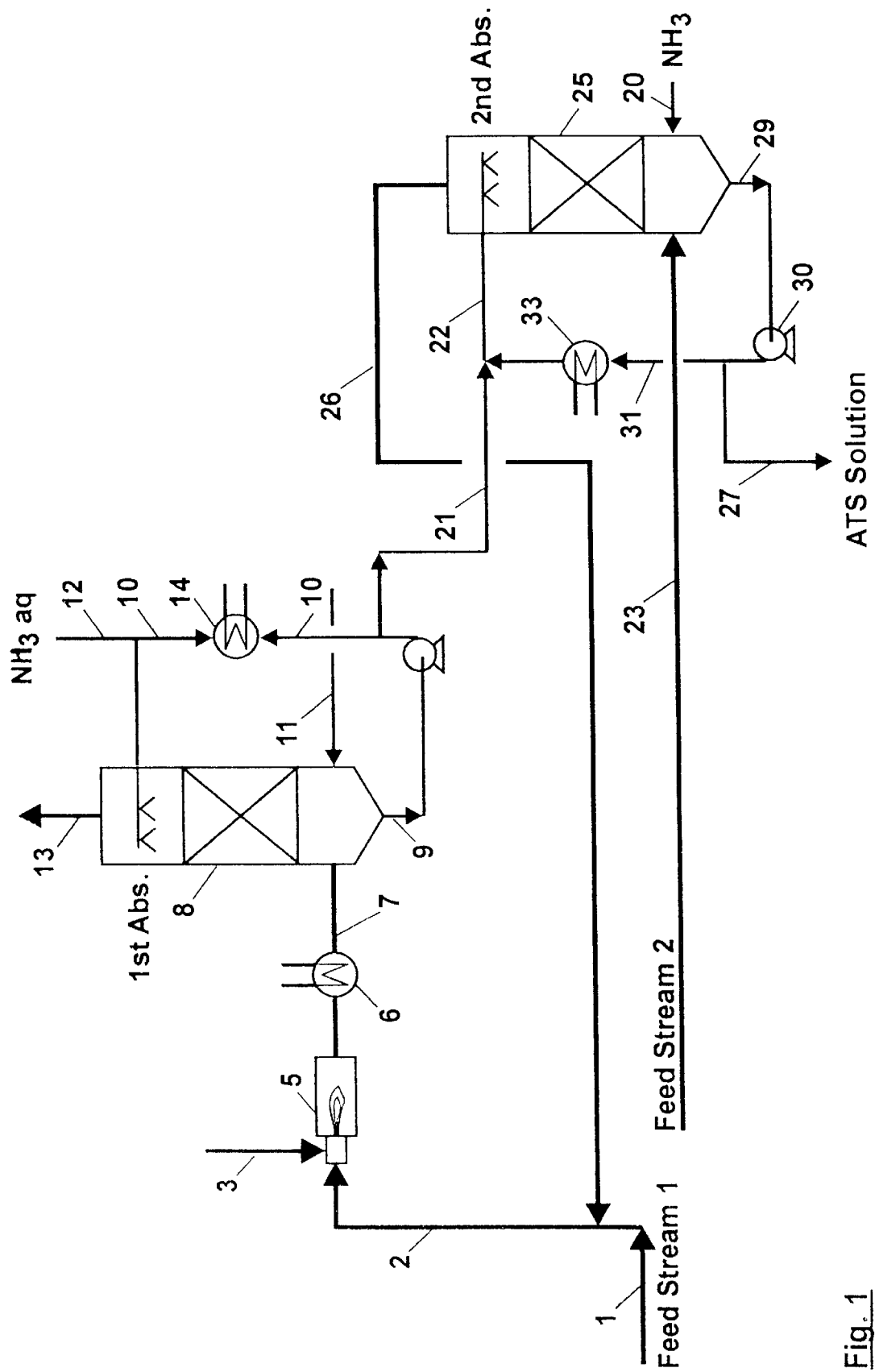
FIGS. 1, 2 and 3 are flow sheets schematically illustrating the process of the invention.

In the process shown in FIG. 1 of the drawings aqueous solutions of ammonium thiosulphate (ATS) are produced from gaseous feed streams comprising $H_2S$ and mixtures of $H_2S$ and $NH_3$. Such feed streams typically occur as off-gas streams from desulphurisation of hydrocarbons, gasification of fuels and coking processes. Feed streams suitable for the process may further contain $SO_2$, $CO_2$, sulphur, COS, $N_2$, $H_2O$ and combustible components such as hydrocarbons.

The sole material to be added to the process is $NH_3$. The process is carried out in a $SO_2$-absorber 8 for production of ammonium hydrogen sulphite (AHS), a $H_2S$-absorber 25 for the production of ATS, and an incinerator 5 upstream of the $SO_2$-absorber. In the $SO_2$-absorber, $SO_2$ in the inlet gas in line 7 is scrubbed with $NH_3$ producing an aqueous solution of ammonium hydrogen sulphite (AHS), which is reacted with $H_2S$ and $NH_3$ in $H_2S$-absorber 25 to an aqueous solution of ammonium thiosulphate. The off-gas from the second absorber typically contains at least 10% $H_2S$ and is passed through line 26 to incinerator 5, in which it is incinerated together with the feed stream in line 1.

Gas streams with very low amounts or free of $NH_3$ are preferred for incorporation in the feed stream in line 1, (Feed Stream 1). Gas streams rich in $H_2S$ and $NH_3$ and free of $SO_2$ are preferred for incorporation in line 23 (Feed Stream 2) being passed to the $H_2S$-absorber. So-called "Sour Water Stripper Gases", which typically contain 30–40 vol % of each of the components $H_2S$, $NH_3$ and $H_2O$, are suited particularly for incorporation in Feed Stream 2.

In incinerator 5, all combustibles in Feed Stream 1 in line 1 and in the off-gas in line 26 are incinerated at 900° C.–1500° C. into $SO_2$, $H_2O$ and $CO_2$, preferably, with less than 0.5% $O_2$ in the outlet gas from the incinerator. The incineration temperature may be controlled according to known principles by recycling cooled $SO_2$-gas to the inlet of the incinerator. The incinerated gas is cooled in heat exchanger 6 and fed through line 7 to the first absorber, wherein a solution comprising ammonium hydrogen sulphite (AHS) is produced by contacting the gas in line 7 with an aqueous solution of $NH_3$ from line 12 to the circulating solution in line 10 in an amount required to keep the pH-value of the solution between 5 and 6, whereby AHS is formed in the solution according to reaction:

$$NH_3+SO_2+H_2O=NH_4HSO_3 \quad (1)$$

Minor amounts of di-ammonium sulphite (DAS) are formed in equilibrium with AHS by reaction:

$$2NH_3+SO_2+H_2O=(NH_4)_2SO_3 \quad (2)$$

The molar DAS:AHS ratio in the solution increases from about 0.01 at pH 5 to 0.1 at pH 6.

The pH value is controlled by addition of $NH_3$. $NH_3$ may, alternatively, be added in gaseous form $NH_3$ to the first absorber through line 11. Necessary make-up water is then added through line 12.

By using two $SO_2$-absorbers connected in series in the $SO_2$-absorption step, as described in the Examples below emission of $SO_2$ and $NH_3$ from the $SO_2$ absorption step is reduced by a factor 10–20, so that 99.9% of the sulphur in the feed streams are recovered in the ATS product stream.

The temperature and pH value of the sulphite solution produced in the $SO_2$-absorption step are selected with consideration for the solubility of the AHS and DAS and the partial pressures in equilibrium with the solution. Calculation of the $H_2O$ mass balance across the $H_2S$-absorber shows that in the absence of $H_2O$ in the gas stream to the $H_2S$-absorber, the concentration of ATS in the product solution is 3% lower than the concentration of AHS+DAS in the solution being passed to the $H_2S$-absorber (with the provision of no significant evaporation of $H_2O$ from the $H_2S$-absorber). This difference increases with increasing $H_2O:H_2S$ ratio in the inlet to the $H_2S$-absorber and reaches 6.5% at $H_2O:H_2S=1$ on molar basis. Thus, with usual feed gas compositions in the $H_2S$-absorber, 60% ATS in the product solution can be achieved with 64–70% AHS+DAS in the solution produced in the $SO_2$-absorption step. At 25° C., up to 70–75% AHS+DAS can be dissolved in water at pH 5. The solubility decreases to about 60–65% at pH 6, because DAS is much less soluble than AHS, and the DAS:AHS ratio increases approximately from 0.01 to 0.1 by increasing pH from 5 to 6. The solubility of AHS and DAS increases with increasing temperature of the solution.

As the emission of $SO_2$ and $NH_3$ from the $SO_2$-absorbers increases strongly with increasing temperature, the temperature in the absorbers is kept as low as allowed by the solubility of the salts in the solution. Therefore, temperatures of about 25° C. are usually selected in the $SO_2$-absorbtion step. When the $SO_2$-absorption step comprises two absorbers in series, it is preferred to operate the second $SO_2$-absorber, which operates on more diluted solutions, at pH up to value of 6 and temperatures down to 10° C. or lower, while the first absorber may operate at pH down to a value of 5 and temperatures up to 40–50° C., in order to keep very high concentration of sulphites in solution.

The partial pressure of $SO_2$ and $NH_3$ in the off-gas from the absorber(s) of the $SO_2$-absorption step in equilibrium with the circulating solution is a function of the temperature, pH and the concentration of sulphite in the solution. This function is known from the literature for diluted solutions, but with considerable uncertainties for concentrated solutions. FIG. 1 shows typical values of equilibrium gas phase concentrations of $SO_2$ and $NH_3$, calculated with the generally accepted values for diluted systems at 25° C. of pKa= 1.81 for $H_2SO_3$, 7 for $HSO_3^-$ and 9.25 for $NH_4^+$, and with Henry-constants of 0.58 and 0.03 atm/mole/liter for $SO_2$ and $NH_3$, respectively.

Equilibrium concentrations of $SO_2$ and $NH_3$ calculated for 8 typical cases at opening conditions of 25° C. and atmospheric pressure are shown in Table 1 below.

TABLE 1

| | pH of the solution | | | | | |
|---|---|---|---|---|---|---|
| | 5.0 | | 5.5 | | 6.0 | |
| mole AHS/1 solution | 0.425 | 8.6 | 0.425 | 8.5 | 0.425 | 8.0 |
| wt % (AHS + DAS)/1 solution | 4.15 | 66 | 4.2 | 67 | 4.5 | 68 |
| SO2 in gas phase/ppm | 160 | 3200 | 50 | 1000 | 16 | 270 |
| NH3 in gas phase/ppm | 0.7 | 15 | 25 | 50 | 9 | 140 |

The absorber is operated at high liquid recycle rates and liquid composition is approximately the same at inlet and outlet of the absorber.

In industrial $SO_2$-absorbers employed in the process, partial pressures of $SO_2$ and $NH_3$ in the exit of the absorbers can be estimated as the above calculated pressures multiplied by a factor 1.5 for diluted solutions and a factor 3–4 for concentrated solutions.

The solution of AHS and DAS produced in the $SO_2$ absorption step is passed through line 21 to $H_2S$-absorber 25, where it is added to the absorbing solution being recirculated in line 31 through the absorber. Gaseous $NH_3$ is added through line 20 to the bottom of the second absorber in an amount required to keep pH-value of the recycling solution at 7–7.5, whereby ATS is produced in the second absorption step according to the equation:

$$2NH_3+4NH_4HSO_3+2H_2S=3(NH_4)_2S_2O_3+3H_2O \quad (3)$$

Small amounts of DAS in the solution react according to the equation:

$$4(NH_4)_2SO_3+2H_2S=3(NH_4)_2S_2O_3+2NH_3+3H_2O. \quad (4)$$

The temperature in the absorber is controlled by heat exchanger 33 installed in line 31.

The solution produced in absorber 25 leaves the absorber through line 27. In order to obtain optimal conversion of AHS+DAS, pH-value shall be kept in the range 6.7–7.7 (controlled by adjusting the rate of addition of $NH_3$), while the concentration of $H_2S$ in the off-gas from the second absorber (controlled by adjusting the flow rate of $H_2S$-rich Feed Stream 2) is higher than about 10% $H_2S$. The content of $NH_3$ in the off-gas is about 0.5%. When pH-value exceeds 8, $CO_2$ will also be absorbed and sulphites may appear in the produced solution, while free sulphur may appear in the solution when pH is below 6.5. Conversion into ATS is independent of the temperature in the range of 20–40° C. The solubility of ATS increases slightly with the temperature, from 64% by weight at 20° C. to 67% at 40° C. An operating temperature of the $H_2S$-absorber at about 25° C. is preferred when solutions with 55–60% ATS and up to 1% DAS+AHS are produced.

The amount of $H_2S$ and $NH_3$ being passed in line 26 to the incinerator increases with increasing concentrations in Feed Stream 2 of components such as $CO_2$, $N_2$ and hydrocarbons, which are not absorbed in the $H_2S$-absorber. All $NH_3$ in the gas to the incinerator is lost by combustion to $N_2$. $H_2S$ in the off-gas from $H_2S$-absorber 25 is completely oxidized to $SO_2$ and utilized for production of AHS and DAS in the $SO_2$-absorber(s). The rate of ATS-formation in absorber 25 increases with the average partial pressure of $H_2S$ in the absorber, and the off-gas from the absorber will typically contain at least 10% $H_2S$ in order to obtain minimum 98% conversion of the sulphites into ATS. Therefore, it is advantageous to operate the second absorber at elevated total pressure.

Conversion rates of up to 99.9% of the sulphites may be obtained at atmospheric pressure in the second absorber.

Incineration in incinerator 5 insures that all combustibles in the feed streams are combusted into $SO_2$, $H_2O$ and $CO_2$. The combustion is carried out with minimum excess of oxygen in order to prevent oxidation of sulphite to sulphate in the $SO_2$-absorber(s) and to prevent formation of NOx during combustion of $NH_3$.

Flow ratio between Stream 1 and Stream 2 is adjusted so that the ratio of $SO_2$ absorbed in absorber 8 to $H_2S$ absorbed in 25 is about 2:1. This ratio is given by the stoichiometry of the reactions taking place in the $SO_2$-absorbers and in the $H_2S$-absorber.

Traces of $H_2S$ and hydrocarbons in the product solution in line 27 can be removed by evacuation of the solution and/or by aerating the solution with combustion air used for the incinerator.

When the concentration of inerts in the feed gas to the $H_2S/NH_3$ absorber is below approximately 20%, it may be advantageous to recycle part of the off-gas in line 26 to the inlet of the absorber 25, or to use as absorber a tank contactor, in which the gas is bobbled through the solution, instead of a packed tower or a bubble-cap column.

Example 1 below gives typical operating conditions of a plant with two $SO_2$-absorbers in series for production, according to the invention, of ATS from a stream of "Sour Water Stripper (SWS) gas" and $H_2S$-gas that would otherwise have been used for production of sulphur in the Claus Process. It is advantageous in the process that all the water that has to be added to the process is added to the last absorber of the $SO_2$-absorbers (i.e. the absorber from which the off-gas is emitted from the process).

EXAMPLE 1

7.0 kmole/h (157 $Nm_3$/h) SWS-gas with 35% $H_2S$, 30% $NH_3$, 34% $H_2O$ and 1% hydrocarbons, calculated as $C_3H_8$, is utilized for production of up to 1200 kg/h of ATS in aqueous solution with minimum 60% ATS and approximately 1% sulphite. Up to 33 kmole/h of $H_2S$-gas with 80% $H_2S$, 15% $CO_2$ and 5% $H_2O$ is available as sulphur make-up gas for the process.

Figure 2:
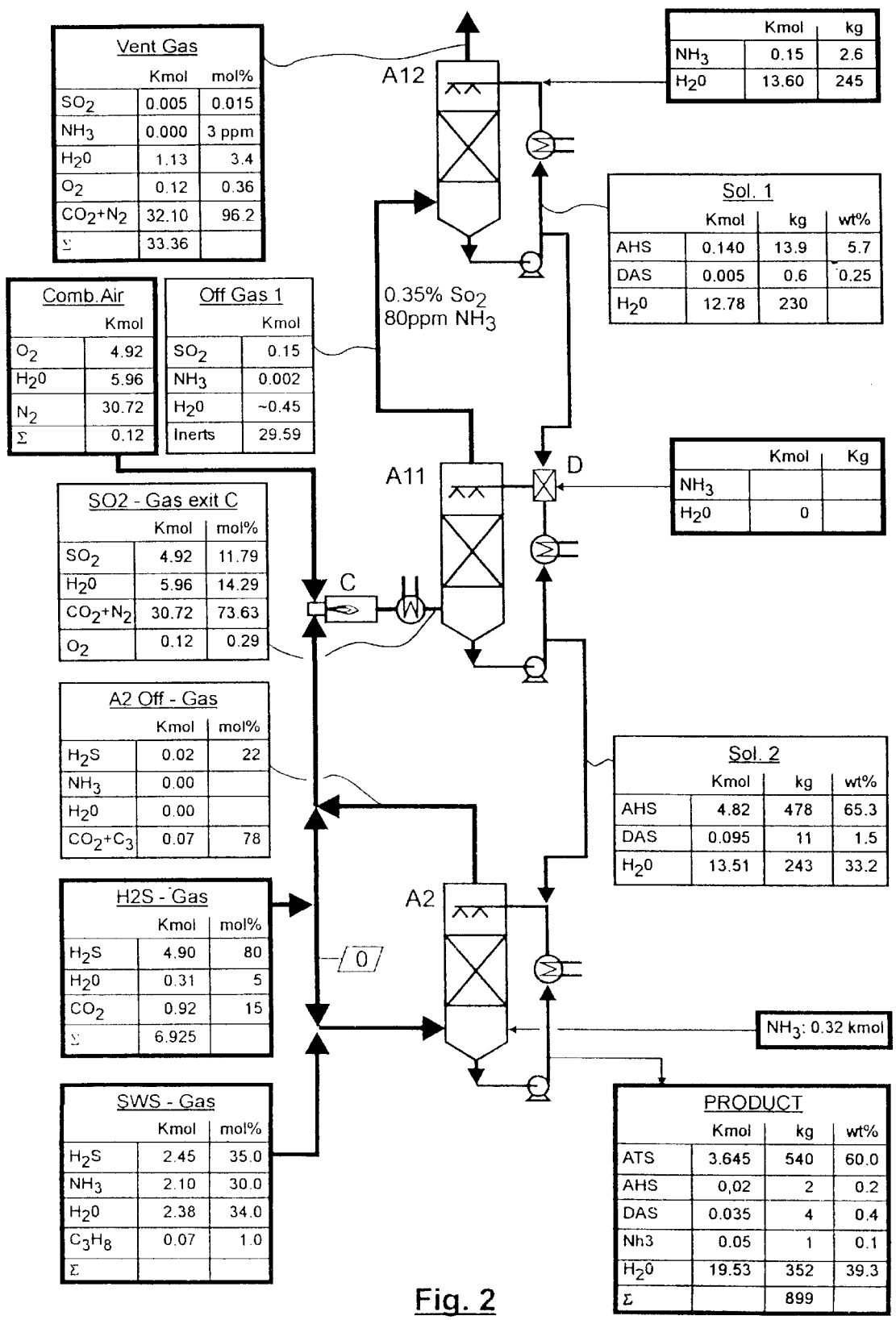
Figure 3:
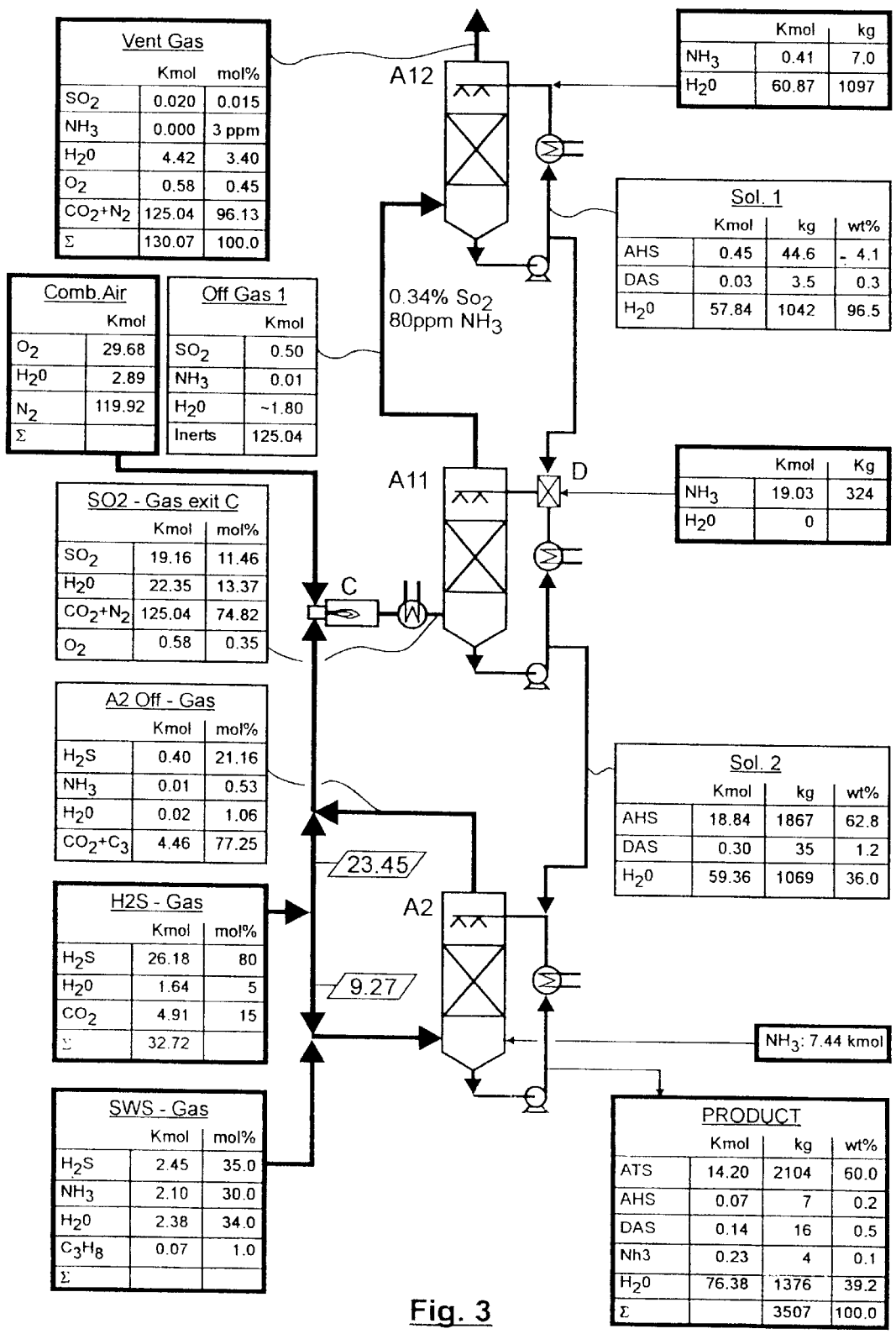

The process is schematically shown in FIG. 2 and FIG. 3 and carried out in two $SO_2$-absorbers (A11 and A12) connected in series with separate recirculation loops, $H_2S/NH_3$ absorber A2, and incinerator C.

$NH_3$ is supplied to the process in form of gaseous $NH_3$.

All make-up water required for the process is added to the second absorber of the $SO_2$-absorption step. $NH_3$ for A12 is dissolved in water being added to A12 and $NH_3$ used in A11 is dissolved in the mixing device D in the stream of solution being passed from A12 to A11. $NH_3$ used in the $H_2S/NH_3$-absorber A2 is mixed with the feed gas for A2 at inlet of A2.

Two cases are analyzed: The "minimum case" in FIG. 3 in which only the amount of $H_2S$-gas required for matching the content of $NH_3$ in the 7 kmole/h of SWS-gas is taken into the process, and the "maximum case" in FIG. 2, in which all the $H_2S$-gas available is used in the process for production of ATS. $NH_3$ is not added to A2 in the "minimum" case.

In both cases, about 99.9% of the sulphur content in the feed streams are recovered in the product stream with 60% ATS and about 0.6% sulphite. All the relevant operating data are given in FIG. 2 and FIG. 3 for each of the two cases.

What is claimed is:

1. A process for continuous production of ammonium thiosulphate from a feed gas comprising $H_2S$, $SO_2$ and $NH_3$ comprising steps of producing in a first absorption step a solution of ammonium hydrogen sulphite by contacting a first gas stream comprising $SO_2$ with $NH_3$ and an aqueous solution comprising ammonium hydrogen sulphite in one or more absorbers connected in series and withdrawing a vent gas from one of the absorbers, passing the solution produced in the first absorption step to a second absorption step in which a second gas stream comprising $H_2S$ is contacted with $NH_3$ and an aqueous solution of ammonium thiosulphate thereby producing a solution being rich in ammonium thiosulphate and an off-gas, wherein the off-gas and the feed gas are incinerated and the incineration product is passed into the first absorption step.

2. The process of claim 1, wherein the stream of $SO_2$-gas to the first absorption step is produced by incineration of the feed gas stream comprising $H_2S$ and off-gas from the second absorption step.

3. The process of claim 1, wherein pH-value of the solutions produced in each of the absorbers in the first absorption step is controlled between 4.5–6.5 and in the second absorption step is controlled between 6.0–8.5.

4. The process of claim 1, wherein the temperature of the solution in each of the absorbers is maintained in the range of 0–60° C.

5. The process of claim 1, wherein make-up water is added to the top of the absorber in the first process step from which all the vent gas from the process is withdrawn.

6. The process of claim 5, wherein the stream(s) of $NH_3$ being introduced into the absorbers in the first absorption step is mixed with the water having been added to the absorber and/or mixed with the solution being passed between two subsequent absorbers.

7. The process of claim 1, wherein the amount of $NH_3$ introduced into the absorber in the second absorption step is mixed with the feed gas at the inlet of the absorber.

* * * * *